United States Patent
Senga et al.

(10) Patent No.: US 10,879,559 B2
(45) Date of Patent: Dec. 29, 2020

(54) METHOD FOR PRODUCING SOLID ELECTROLYTE

(71) Applicant: IDEMITSU KOSAN CO., LTD., Chiyoda-ku (JP)

(72) Inventors: Minoru Senga, Sodegaura (JP); Takayoshi Kambara, Sodegaura (JP); Katsuhito Kondo, Sodegaura (JP); Takashi Umeki, Sodegaura (JP); Naoya Masuda, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 113 days.

(21) Appl. No.: 16/123,154

(22) Filed: Sep. 6, 2018

(65) Prior Publication Data
US 2019/0074544 A1 Mar. 7, 2019

(30) Foreign Application Priority Data

Sep. 6, 2017 (JP) .................. 2017-171221
Mar. 23, 2018 (JP) .................. 2018-056554
Aug. 30, 2018 (JP) .................. 2018-161075

(51) Int. Cl.
*H01M 10/0562* (2010.01)
*H01M 10/0525* (2010.01)
*H01B 1/10* (2006.01)

(52) U.S. Cl.
CPC .......... *H01M 10/0562* (2013.01); *H01B 1/10* (2013.01); *H01M 10/0525* (2013.01); *H01M 2300/0068* (2013.01)

(58) Field of Classification Search
CPC ......... H01M 10/0562; H01M 10/0525; H01M 2300/0068; H01B 1/10
See application file for complete search history.

(56) References Cited

U.S. PATENT DOCUMENTS

| 2010/0290969 | A1  | 11/2010 | Deiseroth et al. |
| 2014/0141339 | A1* | 5/2014  | Sugiura ............... H01B 1/10 429/306 |
| 2014/0272554 | A1* | 9/2014  | Yanagi ............ H01M 10/0562 429/189 |
| 2017/0008808 | A1  | 1/2017  | Yanagi |

FOREIGN PATENT DOCUMENTS

| JP | 2010-540396 A | 12/2010 | |
| JP | 2012-134133 A | 7/2012 | |
| JP | 2014167845 A * | 9/2014 | ........ H01M 10/0562 |
| JP | 2015-179649 A | 10/2015 | |
| JP | 2017-18872 A | 1/2017 | |
| WO | WO-2016009768 A1 * | 1/2016 | ........ H01M 10/0562 |

OTHER PUBLICATIONS

Rao et al. "Studies of lithium argyrodite solid electrolytes for all-solid-state batteries", Phys. Status Solidi A 208, No. 8, pp. 1804-1807 (Year: 2011).*
Yubuchi et al., "An argyrodite sulfide-based superionic conductor synthesized by a liquid-phase technique with tetrahydrofuran and ethanol", J. Mater. Chem. A, 2019, 7, pp. 558-566. (Year: 2019).*
Boulineau et al. "Mechanochemical synthesis of Li-argyrodite Li6PS5X (X=Cl, Br, I) as sulfur-based solid electrolytes for all solid state batteries application", Solid State Ionics 221, pp. 1-5. (Year: 2012).*
Zengcai Liu, et al., "Anomalous High Ionic Conductivity of Nanoporous PβLi₃PS₄," JACS, Journal of the American Chemical Society, vol. 135, No. 3, Jan. 23, 2013, 975-978 and cover letter.
So Yubuchi, et al., "Synthesis of Sulfide-Based Solid Electrolytes and Construction of the Interfaces in Bulk-Type All-Solid-State Batteries Using Liquid-Phase Techniques" Journal of the Japan Society of the Colour Material, vol. 89, No. 9, 2016, 3 pages (with English Abstract).

* cited by examiner

*Primary Examiner* — Gregg Cantelmo
(74) *Attorney, Agent, or Firm* — Oblon, McClelland, Maier & Neustadt, L.L.P.

(57) ABSTRACT

A method for producing a solid electrolyte comprising feeding a solid electrolyte raw material-containing liquid comprising: a solid electrolyte raw material comprising lithium, phosphorus, sulfur and chlorine; and a solvent, to a liquid or gas medium having a temperature higher than the boiling point of the solvent, thereby evaporating the solvent and reacting the solid electrolyte raw material to precipitate a solid electrolyte having an argyrodite-type crystal structure.

15 Claims, 1 Drawing Sheet

METHOD FOR PRODUCING SOLID ELECTROLYTE

TECHNICAL FIELD

Embodiments described herein generally relate to a method for producing a solid electrolyte.

BACKGROUND ART

Due to recent development of mobile communication and information electronic devices, there is an increasing demand for high-capacity and light-weight lithium ion batteries. Most electrolytes that exhibit high lithium ionic conductivity at room temperature are in the form of a liquid, and organic-based liquid electrolytes are used in many commercially available lithium ion batteries. Since there are risks of leakage, ignition and explosion in lithium ion batteries using organic-based liquid electrolytes, batteries with higher safety are desired. All-solid-state batteries using solid electrolytes such as sulfide solid electrolytes have been developed so as to meet the aforementioned demands.

Methods for producing solid electrolytes in which the raw material is reacted while being ground with the use of a ball mill, a vibrating mill, or the like are known. Also, methods in which solid electrolytes are synthesized in a polar solvent have recently been developed. Furthermore, novel solid electrolytes in which morphology such as crystalline structure and particle size are controlled have been actively developed.

For example, Non-Patent Document 1 describes that β-$Li_3PS_4$ was synthesized through reacting $Li_2S$ and $P_2S_5$ in a tetrahydrofuran (THF) solvent and evaporating the THF from the reaction solution by heating so as to dry the reaction product.

Non-Patent Document 2 describes that a crystal of $Li_6PS_5Br$ was synthesized by dissolving the starting materials: $Li_2S$, LiBr and $Li_3PS_4$ in ethanol, reacting the starting materials in the solution, and then distilling the solvent off.

Patent Documents 1 and 2 disclose that solid electrolytes having specific crystal structures were synthesized by heat-treating the raw material.

Also, Patent Document 3 discloses a method for producing particles, and Patent Document 4 discloses a synthesis of solid electrolyte fine particles by using a bead mill.

PRIOR ART DOCUMENTS

Patent Documents

Patent Document 1: JP-A-2015-179649
Patent Document 2: JP-A-2010-540396
Patent Document 3: JP-A-2017-018872
Patent Document 4: JP-A-2012-134133

Non-Patent Documents

Non-Patent Document 1: J. Am. Chem. Soc., 135, 975 (2013)
Non-Patent Document 2: J. Jpn. Soc. Colour Mater., 89[9], 300-305 (2016)

SUMMARY OF THE INVENTION

In the methods of Patent Documents 1 and 2 and Non-Patent Documents 1 and 2, solid electrolytes are synthesized by synthesizing a solid electrolyte or its precursor through solution reaction, mechanical milling reaction, or the like, and then removing the solvent from the obtained product or heat-treating the precursor. In other words, said methods require at least two steps: a reaction step and a solvent removal step or a heat treatment step.

In Patent Document 4, solid electrolyte fine particles are synthesized by obtaining a solid electrolyte with the use of raw material comprising $Li_2S$ and $P_2S_5$ or the like, and then grinding the obtained solid electrolyte into fine particles. This method also requires at least two steps: a synthesis step and a microparticulation step.

Generally, a synthesis of solid electrolyte fine particles comprising a crystalline structure requires at least three steps: a synthesis step, a crystallization step and a microparticulation step, and the production steps are complicated. Thus, there are demands for facilitating the production steps so as to improve the productivity.

One of the objects of the present invention is to provide a method for efficiently producing solid electrolyte fine particles comprising a crystalline structure.

One embodiment of the present invention provides a method for producing a solid electrolyte comprising an argyrodite-type crystal structure (this type of solid electrolyte may hereinafter be called "argyrodite-type solid electrolyte"), which comprises feeding a solid electrolyte raw material-containing liquid comprising: a solid electrolyte raw material comprising lithium, phosphorus, sulfur and chlorine; and a solvent to a liquid or gas medium having a temperature higher than the boiling point of the solvent, thereby evaporating the solvent and reacting the solid electrolyte raw material to precipitate an argyrodite-type crystal structure.

According to one embodiment of the present invention, solid electrolyte fine particles comprising a crystalline structure can be efficiently produced.

EMBODIMENTS FOR CARRYING OUT THE INVENTION

Figure 1:
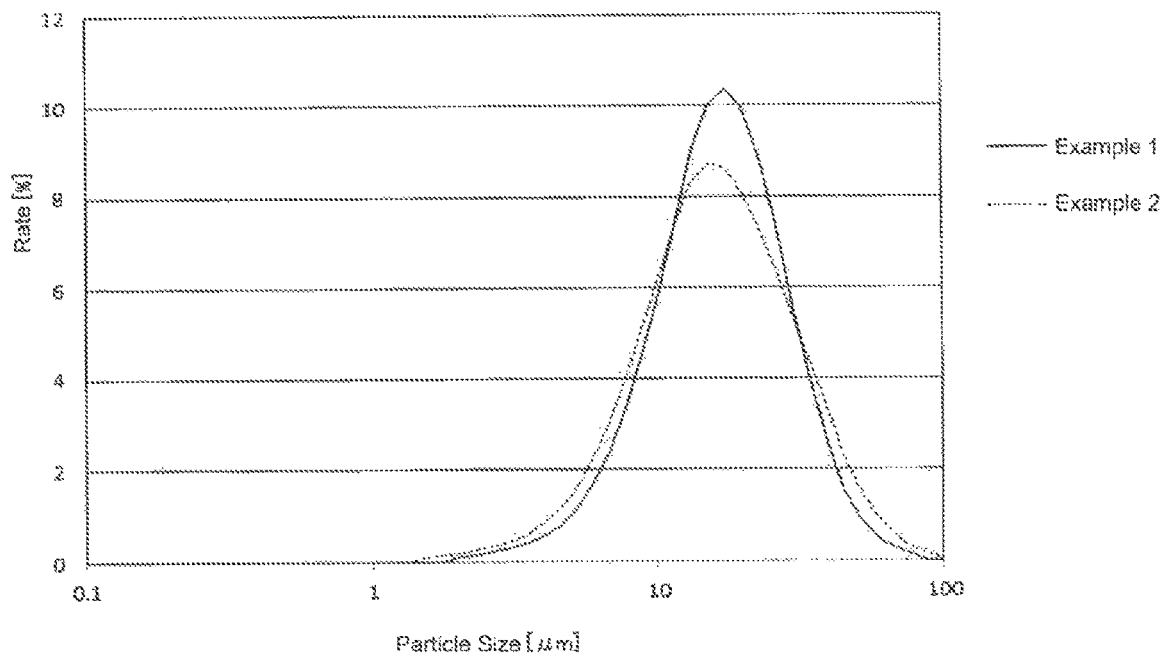
FIG. 1 shows particle size distributions of the solid electrolytes obtained in Examples 1 and 2.

A method for producing a solid electrolyte according to one embodiment of the present invention comprises a step of feeding a solid electrolyte raw material-containing liquid comprising: a solid electrolyte raw material comprising lithium, phosphorus, sulfur and chlorine; and a solvent to a liquid or gas medium having a temperature higher than the boiling point of the solvent, thereby evaporating the solvent and reacting the solid electrolyte raw material to precipitate (form) a solid electrolyte having an argyrodite-type crystal structure. Since the synthesis of an argyrodite-type solid electrolyte and the microparticulation can be performed in a single step by feeding a solid electrolyte raw material-containing liquid to a high-temperature medium, this embodiment achieves higher productivity compared with conventional production methods. A solid electrolyte raw material-containing liquid may be a solution obtained by dissolving the solid electrolyte raw material in a solvent, or a mixed solution in which a part or all of the solid electrolyte raw material is dispersed or mixed undissolved. The solid electrolyte raw material-containing liquid can be fed to the medium by injection, dropwise addition, or the like when the medium is a liquid, and by spraying or the like when the medium is a gas.

As the solid electrolyte raw material, compounds comprising as a constituent element the elements contained in the target solid electrolyte such as lithium, phosphorus, sulfur and chlorine, and optional elements, and/or elementary substances of said elements can be used. Mixtures obtained by combining two or more substances selected from such compounds and elementary substances, and reaction products obtained from such mixtures can be used as the solid electrolyte raw material.

Examples of lithium-containing compounds include lithium sulfide ($Li_2S$), lithium oxide ($Li_2O$), lithium carbonate ($Li_2CO_3$), lithium hydrosulfide (LiSH), lithium trithiocarbonate ($Li_2CS_3$), and lithium polysulfide ($Li_2S_x$, x=2 to 100). Lithium sulfide is preferable among these examples.

Lithium sulfides can be used without particular limitation, but those with high purity are preferable.

Examples of phosphorus- or sulfur-containing compounds include phosphorus sulfides such as diphosphorus trisulfide ($P_2S_3$) and diphosphorus pentasulfide ($P_2S_5$), sodium phosphate ($Na_3PO_4$), and $PSX_3$ (X is an element selected from F, Cl, Br and I). Among these examples, phosphorus sulfides are preferable, and $P_2S_5$ is more preferable.

Examples of chlorine-containing compounds include compounds represented by the general formula ($M_l$-$X_m$).

In the formula, M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a compound in which oxygen atom(s) or sulfur atom(s) is/are bonded to these elements, among which Li and P are preferable, and Li is more preferable.

X is a halogen selected from F, Cl, Br and I, where at least one X is Cl.

Also, l is an integer of 1 or 2, and m is an integer from 1 to 10. When m is an integer from 2 to 10, i.e., when more than one X is present, the multiple X can be the same or different. For example, in $SiBrCl_3$ described later, m is 4 and X consists of different elements Br and Cl.

Specific examples of the compounds represented by the aforementioned formula include NaCl, LiCl, $BCl_3$, $AlCl_3$, $SiCl_4$, $SiCl_3$, $Si_2Cl_6$, $SiBrCl_3$, $SiBr_2Cl_2$, $PCl_3$, $PCl_5$, $POCl_3$, $P_2Cl_4$, $SCl_2$, $S_2Cl_2$, $GeCl_4$, $GeCl_2$, $AsCl_3$, $SeCl_2$, $SeCl_4$, $SnCl_4$, $SnCl_2$, $SbCl_3$, $SbCl_5$, $TeCl_2$, $TeCl_4$, $PbCl_4$, $PbCl_2$, and $BiCl_3$.

LiCl is preferable among the aforementioned examples.

A single compound selected from the aforementioned compounds can be used alone, or two or more compounds can be used in combination as the chlorine-containing compound(s).

In one embodiment of the present invention, the solid electrolyte raw material preferably contains Cl and other halogen(s). In this case, compounds containing other halogens can be used together with the aforementioned chlorine-containing compounds. Specific examples of the compounds containing other halogens include sodium halides such as NaI, NaF and NaBr; lithium halides such as LiF, LiBr and LiI; boron halides such as $BBr_3$ and $BI_3$; aluminum halides such as $AlF_3$, $AlBr_3$ and $AlI_3$; silicon halides such as $SiF_4$, $SiBr_4$ and $SiI_4$; phosphorus halides such as $PF_3$, $PF_5$, $PBr_3$, $POBr_3$, $PI_3$ and $P_2I_4$; sulfur halides such as $SF_2$, $SF_4$, $SF_6$, $S_2F_{10}$ and $S_2Br_2$; germanium halides such as $GeF_4$, $GeBr_4$, $GeI_4$, $GeF_2$, $GeBr_2$ and $GeI_2$; arsenic halides such as $AsF_3$, $AsBr_3$, $AsI_3$ and $AsF_5$; selenium halides such as $SeF_4$, $SeF_6$, $Se_2Br_2$ and $SeBr_4$; tin halides such as $SnF_4$, $SnBr_4$, $SnI_4$, $SnF_2$, $SnBr_2$ and $SnI_2$; antimony halides such as $SbF_3$, $SbBr_3$, $SbI_3$ and $SbF_5$; tellurium halides such as $TeF_4$, $Te_2F_{10}$, $TeF_6$, $TeBr_2$, $TeBr_4$ and $TeI_4$; lead halides such as $PbF_4$, $PbF_2$, $PbBr_2$ and $PbI_2$; and bismuth halides such as $BiF_3$, $BiBr_3$ and $BiI_3$.

Among the aforementioned examples, lithium halides and phosphorus halides are preferable, LiBr, LiI and $PBr_3$ are more preferable, LiBr and LiI are even more preferable, and LiBr is most preferable.

A single compound selected from the aforementioned compounds can be used alone, or two or more compounds can be used in combination as the halogen compound(s).

Elementary substances that can be used as the raw material include lithium metal, elemental phosphorus such as red phosphorus, and elemental sulfur. In some cases, it is effective to use elemental sulfur as a raw material to be used as a dissolution aid.

The aforementioned compounds and elementary substances can be used without particular limitation as long as they are industrially produced and sold. The compounds and elementary substances having high purity are preferable.

Elemental compositions of solid electrolyte raw material are adjusted by mixing the aforementioned compounds and the like. Two or more substances selected from the aforementioned compounds and elementary substances can be used in combination as the solid electrolyte raw material. Also, compounds obtained by reacting the aforementioned substances in advance, such as $Li_3PS_4$, $Li_2P_2S_6$ and $Li_7P_3S_{11}$, can also be used as the solid electrolyte raw material.

In one embodiment of the present invention, the solid electrolyte raw material-containing liquid is preferably obtained by reacting lithium sulfide and phosphorus sulfide in a solvent.

In one embodiment of the present invention, the solid electrolyte raw material is a mixture comprising a lithium compound, a phosphorus compound, and a chlorine-containing compound, where at least one of the lithium compound and the phosphorus compound preferably comprises a sulfur atom. A combination of $Li_2S$, phosphorus sulfide and LiCl is more preferable, and a combination of $Li_2S$, $P_2S_5$ and LiCl is even more preferable. A combination of $Li_2S$, $P_2S_5$, LiCl and LiBr is also preferable.

In order to improve the solubility of the raw material, LiSH, $Li_2CS_3$, $Li_2S_x$, and the like can be used instead of $Li_2S$.

In one embodiment of the present invention, the solid electrolyte raw material preferably comprises one or more selected from phosphorus sulfide, elemental phosphorus, phosphorus chloride, $PSX_3$ (X is a halogen selected from F, Cl, Br and I, where at least one X is Cl), $Li_3PS_4$, $Li_2P_2S_6$, and $Li_7P_3S_{11}$. Also, the solid electrolyte raw material preferably comprises lithium sulfide.

In addition, at least one compound or elementary substance contained in the solid electrolyte raw material is preferably soluble in a solvent. Being soluble means that the compound or elementary substance partly or entirely dissolves in a liquid.

When $Li_2S$, $P_2S_5$ and LiCl are used as the raw material of an argyrodite-type solid electrolyte, the molar ratio of the compounds may be as follows: $Li_2S:P_2S_5:LiCl$=30 to 60:10 to 25:15 to 50. Preferably $Li_2S:P_2S_5:LiCl$=45 to 55:10 to 15:30 to 50, more preferably $Li_2S:P_2S_5:LiCl$=45 to 50:11 to 14:35 to 45, even more preferably $Li_2S:P_2S_5:LiCl$=46 to 49:11 to 13:38 to 42.

When another lithium halide is used as a part of LiCl, the sum of LiCl and the other lithium halide is applied in the aforementioned molar ratio.

A polar solvent can be mentioned as a solvent in which the solid electrolyte raw material is dissolved or dispersed to obtain a liquid containing the raw material. Specific examples of the solvents include nitrile compounds, ketones such as acetone and methyl ethyl ketone, ethers such as tetrahydrofuran, dimethoxyethane and diethyl ether, carbonates such as dimethyl carbonate, esters such as ethyl acetate, alcohols such as ethanol and butanol, amines such as pyridine, aniline, hydrazine, triethylamine, diethylamine, monoethylamine and ammonia, and amides such as N-methylformamide and N-methyl-2-pyrrolidone (NMP). The solvent is preferably an ether or an amine, most preferably an amine, among which pyridine is preferable. When ethers are used, a step of blowing hydrogen sulfide into the liquid containing the raw material is preferably provided. Formation of lithium phosphate in the obtained solid electrolyte can be suppressed by the treatment with hydrogen sulfide. As a result, ionic conductivity of the solid electrolyte can be increased.

A liquid or gas that is stable at temperatures higher than the boiling point of the aforementioned solvent can be mentioned as the medium to which the solid electrolyte raw material-containing liquid is fed.

As a liquid which is the medium, those in which the target argyrodite-type crystal structure is insoluble and which have a high boiling point can be suitably used. The crystal structure being insoluble means that the crystal structure does not partly or entirely dissolve in the liquid but precipitates therein in the form of a solid. Specifically, hydrocarbons and the like having a high boiling point can be used, and examples include saturated hydrocarbons such as tridecane and tetradecane, and aromatic hydrocarbons such as diaryl ether, alkyl aryl and aryl halide.

The boiling point of the liquid is preferably 150° C. or higher and 500° C. or lower, more preferably 180° C. or higher and 400° C. or lower, since the solvent injected into the medium can be easily removed by volatilization and decomposition of the solvent and the medium can be suppressed at said temperatures.

As a gas which is the medium, an inert gas can be used. Nitrogen, argon, and the like can be mentioned as an inert gas. In some cases, hydrogen sulfide can be used. Hydrogen sulfide can be used alone, or by mixing hydrogen sulfide with an inert gas. In certain cases, contamination with impurities such as oxygen components can be reduced by using hydrogen sulfide. The gas preferably has a temperature of 150° C. or higher and 700° C. or lower.

When using a liquid as the medium, the liquid is preferably used in a state where the liquid is filled in a container under agitation.

When using a gas as the medium, the gas is preferably used in a state where the gas is flowed as in a spray dryer, a slurry dryer, or the like.

In this embodiment, a liquid containing the aforementioned solid electrolyte raw material is fed to a high-temperature medium. The solid electrolyte raw material-containing liquid is rapidly heated by bringing the solution into contact with a high-temperature medium. As a result, the solvent evaporates and a solid component precipitates in the form of fine particles. This solid component is an argyrodite-type solid electrolyte or its precursor produced as a result of a reaction of the raw material. Thereafter, the solid component crystallizes by the heating in the high-temperature medium. Argyrodite-type solid electrolyte fine particles are thereby obtained.

Feeding of the solid electrolyte raw material-containing liquid to the medium can be performed by injection, dropwise addition, or the like when the medium is a liquid, and by spraying or the like when the medium is a gas.

The solid electrolyte raw material-containing liquid is preferably fed in small portions of a prescribed amount so as to cause microparticulation and to homogenize the solid electrolyte. The feed amount needs to be suitably adjusted in accordance with the medium used, temperature, and the like. A tube pump or a micro-spray, for example, can be used for feeding the solid electrolyte raw material-containing liquid.

Solid electrolyte fine particles are obtained by collecting the solid component from the medium. In this embodiment, heat treatment (crystallization treatment) and microparticulation treatment are done at the point where the solid component is collected form the medium. A further heat treatment may be additionally performed. In some cases, the volatile content can be reduced, degree of crystallization can be improved, or ionic conductivity can be improved by the further heat treatment.

Whether or not the collected solid electrolyte comprises an argyrodite-type crystal structure can be confirmed by the presence of diffraction peaks at $2\theta=25.2\pm0.5$ deg and $29.7\pm0.5$ deg in a powder X-ray diffractometry using $Cu\kappa\alpha$ rays. The diffraction peaks at $2\theta=25.2\pm0.5$ deg and $29.7\pm0.5$ deg derive from an argyrodite-type crystal structure. Diffraction peaks of an argyrodite-type crystal structure may also be observed at $2\theta=15.3\pm0.5$ deg, $17.7\pm0.5$ deg, $31.1\pm0.5$ deg, $44.9\pm0.5$ deg, and $47.7\pm0.5$ deg, for example.

Crystal structures disclosed in JP-A-2010-540396 and the like can be mentioned as an argyrodite-type crystal structure. Examples of compositional formulae include $Li_6PS_5X$ and $Li_{7-x}PS_{6-x}X_x$ (X=Cl, Br, I, x=0.0 to 1.8).

In this embodiment, the solid electrolyte may comprise an amorphous (glass) component as a part thereof as long as an argyrodite-type crystal structure is contained. An amorphous component shows a halo pattern in a powder X-ray diffraction measurement. Also, the solid electrolyte may comprise a crystal structure other than an argyrodite-type crystal structure. In addition, raw material may remain in the solid electrolyte.

The solid electrolyte obtained in this embodiment preferably has a volume average particle size ($D_{50}$) of 200 μm or less from the viewpoint of using the solid electrolyte as a battery material. The volume average particle size is preferably 0.1 μm or more and 100 μm or less, more preferably 0.1 μm or more and 50 μm or less, even more preferably 0.1 μm or more and 20 μm or less. The details of the measurement of $D_{50}$ are explained in the examples described below.

EXAMPLES

The present invention is further explained in detail below by reference to examples.

The evaluation methods are as follows.
(1) Measurement of Powder X-Ray Diffraction (XRD)

The solid electrolyte powder produced in each example was filled in a groove with a diameter of 20 mm and a depth of 0.2 mm and smoothed with a glass to obtain a specimen. X-ray diffraction pattern of the specimen was measured without exposing the same to air by using a Kapton film for XRD. The 2θ positions of diffraction peaks were determined by means of the Le Bail analysis with the use of an XRD analysis program RIETAN-FP.

The measurement was performed according to the following conditions with the use of a powder X-ray diffractometer D2 PHASER from Bruker Japan K.K.
Tube voltage: 30 kV
Tube current: 10 mA
X-ray wavelength: Cu-κα rays (1.5418 Å)
Optical system: Focusing method
Slit configuration: Solar slit 4°, divergence slit 1 mm, κβ filter (Ni plate)
Detector: Semiconductor detector
Measurement range: 2θ=10-60 deg
Step width, scanning speed: 0.05 deg, 0.05 deg/sec An XRD analysis program RIETAN-FP was used for the analysis of the peak positions for confirming the presence of a crystal structure based on the measurement results, and the peak positions were determined by correcting the baseline based on the 11th-degree Legendre orthogonal polynomials.

(2) Measurement of Ionic Conductivity

The solid electrolyte was filled into a tablet molding machine, and a molding was obtained by applying a pressure of 407 MPa. Carbon was placed on both sides of the molding as electrodes, and a pressure was applied again in the tablet molding machine so as to obtain a molding (diameter: about 10 mm, thickness: 0.1 to 0.2 cm) for use in the measurement. Ionic conductivity of the molding was measured by means of altering current impedance measurement. The values of conductivity measured at 25° C. were used as the measurement values.

(3) Volume Average Particle Size ($D_{50}$)

A laser diffraction/scattering particle size distribution analyzer (manufactured by HORIBA Ltd., LA-950V2 model: LA 950W2) was used for the measurement.

A mixture obtained by mixing dehydrated toluene (manufactured by Wake Junyaku, special grade) with tertiary butyl alcohol (manufactured by Wako Junyaku, special grade) in a weight ratio of 93.8:6.2 was used as a dispersing medium. 50 mL (milliliters) of the dispersing medium was injected into the flow cell of the analyzer and circulated therein, the subject of the measurement was added thereto and an ultrasonic treatment was performed, and then the particle size distribution was measured. The amount of the subject of the measurement added was adjusted so that the red transmission (R) and the blue transmission (B) corresponding to the particle concentration would be within 80 to 90% and 70 to 90%, respectively, in the measurement display of the analyzer. Regarding the calculation conditions, 2.16 was used as the value of the refractive index of the subject of the measurement and 1.49 was used as the refractive index of the dispersing medium. Regarding the form of distribution, the number of iteration was fixed to 15, and the particle size was calculated.

Production Example 1

(Production of Lithium Sulfide ($Li_2S$))

Lithium sulfide was produced by the method described in Example 1 of WO 2016/098351.

Specifically, 200 g of an anhydrous lithium hydroxides dried in an inert gas (manufactured by the Honjo Chemical Corp., particle size range: 0.1 mm or more and 1.5 mm or less, moisture content: 1 wt % or less) was introduced into a 500 mL separable flask equipped with an anchor stirring blade. The anhydrous lithium hydroxide was heated under a nitrogen flow while under agitation at 200 rpm, and the inner temperature (powder) was maintained at 200° C. with the use of an oil bath. At the same time, the upper part of the separable flask was maintained at 100° C. with the use of a ribbon heater. The nitrogen gas was switched to a hydrogen sulfide gas (manufactured by Sumitomo Seika Chemicals Co., Ltd.), the flow rate was adjusted to 500 mL/min, and the anhydrous lithium hydroxide and hydrogen sulfide were reacted under agitation using the anchor stirring blade.

The moisture formed by the reaction was collected by condensation with the use of a condenser. 144 mL of water was collected after carrying out the reaction for 6 hours. The reaction was further continued for 3 hours while maintaining the flow rate of the hydrogen sulfide at 500 mL/min, but no water was formed. Also, no adhesion of the product to the separable flask and the like was confirmed.

Subsequently, the hydrogen sulfide gas was switched to a nitrogen gas while maintaining the temperature at 200° C., the nitrogen gas was blown in for 20 minutes so as to substitute the hydrogen sulfide gas in the flask with nitrogen gas. The inner temperature was reduced while blowing in nitrogen gas to collect the product powder ($Li_2S$). As a result of potentiometric titration, the obtained $Li_2S$ was confirmed to have a purity of 98.5 wt % and the LiOH content in $Li_2S$ was confirmed to be 0.1 wt % or less.

Example 1

(Preparation of Solid Electrolyte Raw Material-Containing Liquid)

As the raw material, 6.763 g of $Li_3PS_4$, 0.690 g of $Li_2S$ produced in Production Example 1, and 2.547 g of LiCl (manufactured by Sigma-Aldrich) were weighed and introduced into a 500 mL container under a nitrogen gas atmosphere. 120 mL of dehydrated ethanol was added to the container to obtain a solid electrolyte raw material-containing liquid.

$Li_3PS_4$ (glass) was synthesized by the method described in Example 4 of JP-A-2012-134133. Specifically, 30.62 g of $Li_2S$ produced in Production Example 1 and 49.38 g of $P_2S_5$ (manufactured by Sigma-Aldrich) were placed in a 500 mL alumina container containing 175 alumina balls with a diameter of 10 mm, and the container was sealed. The molar ratio of $Li_2S$ to $P_2S_5$ ($Li_2S:P_2S_5$) was 75:25. The alumina container was attached to a planetary ball mill (manufactured by Fritsch, model: P-5) and a treatment (mechanical milling) was carried out for 36 hours at a rotational speed of 250 rpm so as to synthesize $Li_3PS_4$.

(Conditioning of High-Temperature Medium)

480 mL of tridecane was introduced into a 500 mL separable flask equipped with an agitator and a condenser, and the gas inside the flask was substituted with $N_2$ gas. The tridecane was heated to 210° C. and maintained at said temperature.

(Injection of Solid Electrolyte Raw Material-Containing Liquid)

The solid electrolyte raw material-containing liquid was injected into the separable flask over approximately 1 hour with the use of a tube pump. Ethanol volatilized at the same time as the injection of the solid electrolyte raw material-containing liquid. The evaporated ethanol was liquefied by means of the condenser and collected. Solids content precipitated in tridecane and formed a slurry at the same time as the evaporation of ethanol. Agitation was continued for 30 minutes after the injection of the solid electrolyte raw material-containing liquid was completed.

(Collection of Product)

The slurry composed of tridecane and the solids content (product) was cooled to 100° C., then the solids content was separated by decantation. The separated solids content was washed with toluene three times. After washing, the solids content was vacuum-dried at 150° C. so as to collect the solids content.

As a result of an XRD measurement, the collected solids content was confirmed to comprise an argyrodite-type crystal structure. The ionic conductivity was $6\times10^{-5}$ S/cm, and the $D_{50}$ was 16 μm. The particle size distribution of the solid electrolyte is shown in FIG. 1.

(Heat Treatment)

The solid electrolyte obtained in Example 1 was set in a gas-flow furnace and subjected to a heat treatment for 8 hours at 430° C. under a hydrogen sulfide flow.

Diffraction peaks derived from an argyodite-type crystal structure and from the impurities, i.e., lithium phosphate and lithium chloride, were observed in an XRD measurement. The ionic conductivity was 2 mS/cm, and the $D_{50}$ was 37 μm.

Example 2

With respect to the preparation of the solid electrolyte raw material-containing liquid, 3.179 g of $Li_2S$ as a raw material and 7.701 g of elemental sulfur (manufactured by Aldrich) as a dissolution aid were weighed and introduced into a 500 mL container under a nitrogen gas atmosphere, and then 120 mL of tetrahydrofuran (THF: dehydrated product) was added to the container to obtain a solution. Subsequently, 4.174 g of $P_2S_5$ and 2.547 g of LiCl were added and dissolved therein so as to prepare a solid electrolyte raw material-containing liquid.

Other steps were carried out in the same manner as in Example 1 to obtain a solid electrolyte, and the solid electrolyte was subjected to a heat treatment.

As a result of an XRD measurement, the solid electrolyte (before heat treatment) was confirmed to comprise an argyrodite-type crystal structure. The ionic conductivity was $6\times10^{-5}$ S/cm, and $D_{50}$ was 15 μm. The particle size distribution of the solid electrolyte is shown in FIG. 1.

The ionic conductivity after heat treatment was 0.05 mS/cm. Diffraction peaks derived from an argyrodite-type crystal structure and from the impurity, lithium phosphate, were observed in an XRD measurement.

Example 3-1

(Preparation of Solid Electrolyte Raw Material-Containing Liquid)

3.279 g of $Li_2S$ produced in Production Example 1, 2.547 g of LiCl (manufactured by Sigma-Aldrich), and 4.174 g of $P_2S_5$ (manufactured by Sigma-Aldrich) were weighed and introduced into a 500 mL container under a nitrogen gas atmosphere. 120 mL of dehydrated pyridine was added to the container under ice-cooling while under agitation. 20 hours after increasing the temperature to room temperature, the mixture was heated to 80° C. and reacted for 5 hours.

Since the mixture was viscous after the reaction, 20 mL of pyridine was added, and then hydrogen sulfide was blown into the reaction mixture for 1 hour at a rate of 100 mL/min so as to obtain a solid electrolyte raw material-containing liquid (solvent: pyridine, treated with hydrogen sulfide).

Other steps were carried out hi the same manner as in Example 1.

Figure 2:
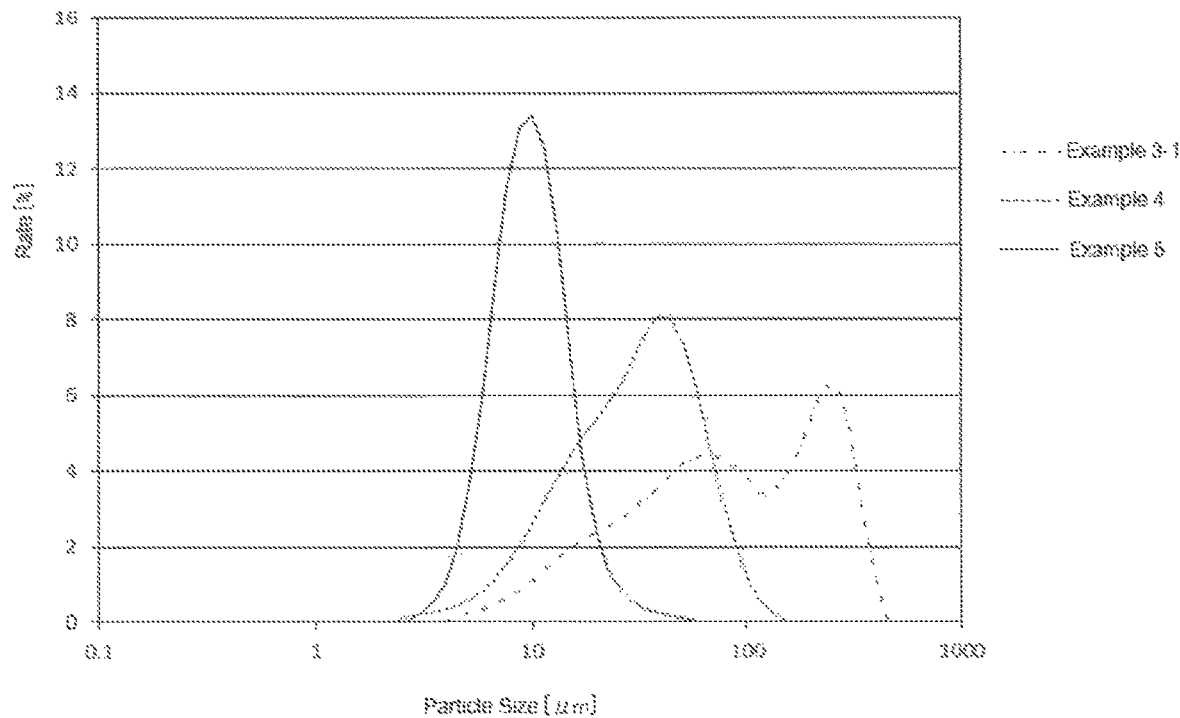
FIG. 2 shows particle size distributions of the solid electrolytes obtained in Examples 3-1, 4 and 5.

As a result of an XRD measurement, the collected solids content was confirmed to comprise an argyrodite-type crystal structure. The ionic conductivity was $3.29\times10^{-6}$ S/cm, and the $D_{50}$ was 78 μm. The particle size distribution of the solid electrolyte is shown in FIG. 2.

(Heat Treatment)

The solid electrolyte obtained in Example 3-1 was set in a gas-flow furnace and subjected to a heat treatment for 8 hours at 430° C. under a hydrogen sulfide flow. As a result of the heat treatment, an argyrodite-type crystal structure was observed as the main component in an XRD measurement. The ionic conductivity was 7.08 mS/cm.

Example 3-2

A solid electrolyte was produced in the same manner as in Example 3-1 except that hydrogen sulfide was not blown in at the time of preparing the solid electrolyte raw material-containing liquid, and the obtained solid electrolyte was subjected to a heat treatment.

As a result of an XRD measurement, the solid electrolyte (before heat treatment) was confirmed to comprise an argyrodite-type crystal structure. The ionic conductivity was $3\times10^{-6}$ S/cm.

The ionic conductivity of the solid electrolyte after heat treatment was 8.5 mS/cm. An argyrodite-type crystal structure was observed as the main component in an XRD measurement.

Examples 3-1 and 3-2 confirmed that the ionic conductivity of solid electrolytes was greatly improved by the heat treatment when pyridine was used as the solvent, irrespective of whether or not the solid electrolyte raw material-containing liquid was treated with hydrogen sulfide.

Example 4

A solid electrolyte was produced in the same manner as in Example 3-1, except that the solid electrolyte raw material-containing liquid (solvent: THF, treated with hydrogen sulfide) was prepared by using dehydrated THF instead of dehydrated pyridine, and the obtained solid electrolyte was subjected to a heat treatment.

As a result of an XRD measurement, the solid electrolyte (before heat treatment) was confirmed to comprise an argyrodite-type crystal structure. The ionic conductivity was $6.60\times10^{-5}$ S/cm, and the $D_{50}$ was 29 μm. The particle size distribution of the solid electrolyte is shown in FIG. 2.

After the heat treatment, an argyrodite-type crystal structure was observed as the main component in an XRD measurement. The ionic conductivity was 4.47 mS/cm.

It was confirmed that in the case of using THF, which is an ether, as the solvent, the ionic conductivity was greatly improved by heat-treating the solid electrolyte of Example 4 compared with Example 2 which uses a solid electrolyte raw material-containing liquid obtained without blowing in hydrogen sulfide.

Example 5

(Spraying of Solid Electrolyte Raw Material-Containing Liquid)

The solid electrolyte raw material-containing liquid (solvent: pyridine, treated with hydrogen sulfide) prepared in Example 3-1 was treated with the use of a spray-dryer (micro mist spray dryer Labo MDL-015 (C) M-H, manufactured by Fujisaki Electric Co., Ltd.) so as to obtain a solid electrolyte, 300° C. nitrogen was used as a high-temperature medium (dry gas).

As a result of an XRD measurement, the solid electrolyte was confirmed to comprise an argyrodite-type crystal structure. The ionic conductivity was 2.32×10−4 S/cm, and the $D_{50}$ was 9 μm. The particle size distribution of the solid electrolyte is shown in FIG. 2.

(Heat Treatment)

The solid electrolyte obtained in Example 5 was set in a gas-flow furnace and subjected to a heat treatment for 8 hours at 430° C. under a hydrogen sulfide flow.

Diffraction peaks of an argyrodite-type crystal structure and a β-crystal of $Li_3PS_4$ were observed in an XRD measurement. The ionic conductivity was 2 mS/cm.

Comparative Example 1

A solid electrolyte raw material-containing liquid (solvent: ethanol) prepared in the same manner as in Example 1 was heated for 3 hours at 150° C. in an oil bath while under agitation in vacuum so as to remove the ethanol and to dry the solution, and the solids content was collected.

No diffraction peaks derived from an argyrodite-type crystal structure were observed in an XRD measurement of the solids content.

Comparative Example 2

A solid electrolyte raw material-containing liquid (solvent: THF) prepared in the same manner as in Example 2 was heated for 3 hours at 150° C. in an oil bath while under agitation in vacuum so as to remove the THF and to dry the solution, and the solids content was collected.

No diffraction peaks derived from an argyrodite-type crystal structure were observed in an XRD measurement of the solids content.

Comparative Example 3

Solids content was collected in the same manner as in Comparative Example 2 except that a solid electrolyte raw material-containing liquid (solvent: THF, treated with hydrogen sulfide) prepared in the same manner as in Example 4 was used.

No diffraction peaks derived from an argyrodite-type crystal structure were observed in an XRD measurement of the solids content.

Comparative Example 4

A solid electrolyte raw material-containing liquid (solvent: pyridine) prepared in the same manner as in Example 3-2 was heated for 3 hours at 150° C. in an oil bath while under agitation in vacuum so as to remove pyridine and to dry the solution, and the solids content was collected.

No diffraction peaks derived from an argyrodite-type crystal structure were observed in an XRD measurement of the solids content.

Comparative Example 5

The solids content was collected in the same manner as in Comparative Example 4 except that a solid electrolyte raw material-containing liquid prepared in the same manner as in Example 3-1 (solvent: pyridine, treated with hydrogen sulfide) was used.

No diffraction peaks derived from an argyrodite-type crystal structure were observed in an XRD measurement of the solids content.

Several embodiments and/or examples of the present invention have been explained in detail above, but those skilled in the art can readily apply many modifications to these exemplary embodiments and/or examples without substantially deviating from the novel teachings and effects of the present invention. Thus, all such modifications are included within the scope of the present invention.

The contents of the documents mentioned in this specification and of the applications on the basis of which this application claims priority under the Paris Convention are incorporated herein by reference in its entirety.

The invention claimed is:

1. A method for producing a solid electrolyte, the method comprising feeding a solid electrolyte raw material-containing liquid comprising lithium, phosphorus, sulfur and chlorine, and a solvent,
    to a liquid or gas medium having a temperature higher than the boiling point of the solvent, thereby evaporating the solvent and reacting the solid electrolyte raw material to precipitate an argyrodite-type crystal structure.

2. The method for producing a solid electrolyte according to claim 1, wherein the solvent is an amine or an ether.

3. The method for producing a solid electrolyte according to claim 2, wherein the amine is pyridine.

4. The method for producing a solid electrolyte according to claim 1, wherein
    the solvent is an ether, and
    the method comprises blowing hydrogen sulfide into the solid electrolyte raw material-containing liquid.

5. The method for producing a solid electrolyte according to claim 1, wherein
    the medium is a liquid, and
    the argyrodite-type crystal structure is insoluble in the medium.

6. The method for producing a solid electrolyte according to claim 1, wherein
    the medium is a liquid, and
    the solid electrolyte raw material-containing liquid is injected into or added dropwise to the medium.

7. The method for producing a solid electrolyte according to claim 1, wherein
    the medium is a gas, and
    the solid electrolyte raw material-containing liquid is sprayed to the gas.

8. The method for producing a solid electrolyte according to claim 1, wherein the solid electrolyte raw material comprises a compound comprising one or more element selected from lithium, phosphorus, sulfur and chlorine, or an elemental substance thereof.

9. The method for producing a solid electrolyte according to claim 1, wherein the solid electrolyte raw material comprises lithium chloride.

10. The method for producing a solid electrolyte according to claim 1, wherein the solid electrolyte raw material comprises one or more selected from the group consisting of phosphorus sulfide, a phosphorus elementary substance, phosphorus chloride, $PSX_3$, $Li_3PS_4$, $Li_2P_2S_6$ and $Li_7P_3S_{11}$; wherein X is one or more halogen elements selected from F, Cl, Br and I, wherein at least one X is Cl.

11. The method for producing a solid electrolyte according to claim 1, wherein the solid electrolyte raw material comprises lithium sulfide.

12. The method for producing a solid electrolyte according to claim 1, wherein lithium sulfide and phosphorus sulfide are reacted in advance in the solvent to obtain a solid electrolyte raw material in the solvent.

13. The method for producing a solid electrolyte according to claim 1, wherein the solid electrolyte has a volume average particle size ($D_{50}$) of 200 µm or less.

14. The method for producing a solid electrolyte according to claim 1, wherein at least one of a compound or an elementary substance contained in the solid electrolyte raw material is soluble in the solvent.

15. The method for producing a solid electrolyte according to claim 1, wherein the medium is a saturated hydrocarbon or an aromatic hydrocarbon.

* * * * *